United States Patent [19]

Roberts

[11] Patent Number: 5,008,935
[45] Date of Patent: Apr. 16, 1991

[54] EFFICIENT METHOD FOR ENCRYPTING SUPERBLOCKS OF DATA

[75] Inventor: Thomas J. Roberts, Batavia, Ill.

[73] Assignee: AT&T Bell Laboratories, Murray Hill, N.J.

[21] Appl. No.: 374,314

[22] Filed: Jun. 30, 1989

[51] Int. Cl.$^5$ .............................................. H04L 9/06
[52] U.S. Cl. ......................................... 380/29; 380/9; 380/28; 380/49; 380/50
[58] Field of Search ................... 380/9, 29, 36, 37, 42, 380/49, 50; 364/200, 900

[56] References Cited

U.S. PATENT DOCUMENTS

| 3,921,151 | 11/1975 | Guanella | 380/36 |
| 4,802,220 | 1/1989 | Marker, Jr. | 380/33 |
| 4,907,275 | 3/1990 | Hashimoto | 380/50 |

FOREIGN PATENT DOCUMENTS

| 0027572 | 4/1981 | European Pat. Off. | 380/37 |
| 2379947 | 9/1978 | France | 380/37 |

OTHER PUBLICATIONS

D. Kahn, *The Codebreakers, The Story of Secret Writing*, 1967, pp. 339-347.

Primary Examiner—Stephen C. Buczinski
Assistant Examiner—Bernarr Earl Gregory
Attorney, Agent, or Firm—Werner Ulrich

[57] ABSTRACT

This invention relates to an arrangement for encrypting data for storage in a computer and/or for transmission to another data processing system. The plain text data is divided into buffers and the buffers are divided into blocks. The blocks are encrypted under the control of a first key using any block encryption method such as the Data Encryption Standard (DES). Individual bytes of the encrypted blocks of a buffer are then permuted under the control of a second key to form an encrypted buffer. Advantageously, the number of permutations for even a modest size buffer, say 256 bytes, is enormous, making unauthorized decryption using key searching methods computationally infeasible.

13 Claims, 2 Drawing Sheets

EFFICIENT METHOD FOR ENCRYPTING SUPERBLOCKS OF DATA

TECHNICAL FIELD

This invention relates to arrangements for encrypting a buffer of data, the buffer comprising a plurality of blocks.

PROBLEM

It is well known in the field of encryption that the longer the basic block of data which is being encrypted the more difficult it is to break the encryption. At the same time it is also much more complex to encrypt a very long block of data and this is one of the reasons why such arrangements as the Data Encryption Standard (DES) encryption scheme operate on only 64 bits at a time. Further, while arrangements such as the DES encryption scheme can be implemented in hardware and integrated circuits are now available which perform such encryption, these encryption schemes do not lend themselves readily and efficiently to the use of a processor under software control for performing the encryption. Accordingly, a problem in the prior art is that there is no efficient arrangement implemented largely in software for encrypting and decrypting data for storage in a storage device under processor control, for possible subsequent transmission.

SOLUTION

In accordance with the principles of this invention, a superblock or buffer of data comprising a plurality of blocks, each block containing an integral number of words, is encrypted in the following way. First, each block is encrypted using a block encryption arrangement (such as a DES encryption or a simpler program-controlled encryption) and a first key. The outputs of these encryptors are organized into words and these output words from all of the encryptors are permuted according to a second key to generate the encrypted output. Advantageously, the second encryption key can have N! values which will make it very difficult to attack an encrypted message when N is a number such as 256 representing a buffer of 256 words (bytes) or 2,048 bits.

Decryption of the encrypted data is accomplished by placing the encrypted data into a buffer, performing the inverse permutation of the words, and applying block decryptors to obtain the original data buffer. This is simply the inverse of the encryption process described above; it requires no more effort than the encryption process, when the keys are known.

In one specific implementation of applicant's invention, only two keys are used, the same key being used for all of the block encryptors. Each block encryptor encrypts 8 bytes using the DES algorithm (in Electronic Code Book mode). The permuter then takes the 256 byte output of the 32 block encryptors and permutes the 256 bytes in conformance with a second key. This second key has 256! values and so it is computationally infeasible to break an encoding using key-searching methods.

DETAILED DESCRIPTION

Figure 1:
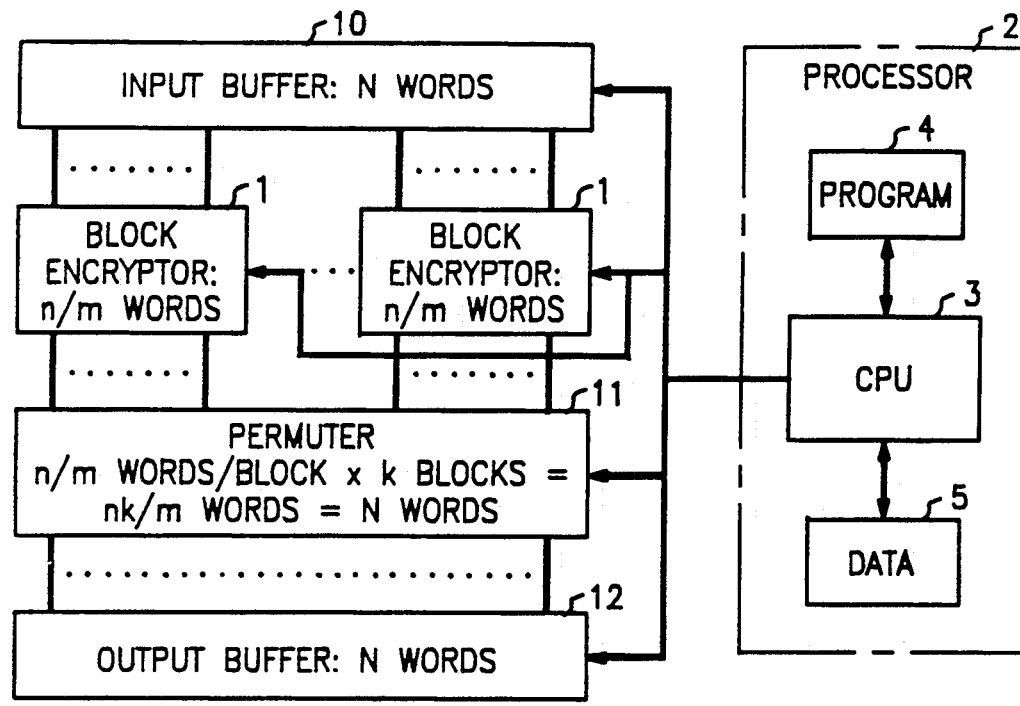
FIG. 1 is a block diagram of an encryption arrangement in conformance with the principles of this invention.

FIG. 1 is a block diagram which illustrates the operation of the invention. In the figure, N is the number of words in the input buffer, and in the output buffer; m is the number of bits in each word; n is the number of bits processed by a single block encryptor; k is the number of block encryptors necessary to process the input buffer. Thus, each block encryptor handles n/m words, and there are nk/m=N words in the buffers.

One buffer of the plain text to be encrypted is originally stored in an input buffer, 10, N words long. A convenient size for the word is an 8 bit byte. For processors using a different length word, 16 or 32 bits might be more convenient. The input buffer, which is stored in data store 5 of processor 2, is N words long and in this specific implementation N is 256. The buffer may be thought of as consisting of an integral number of blocks of convenient length. In this specific implementation, each block is 64 bits or 8 words long so that the buffer stores 32 blocks each 8 words long. Each of these blocks is then encrypted by block encryptors 1 using any convenient encryption algorithm such as the DES algorithm and the output of each block encryption is organized into an integral number of words. The words from all encrypted blocks are then permuted (box 11) using a second key. The permuting process is particularly easy to perform in a program controlled processor 2, comprising a central processing unit 3, a data store 5, and a program store 4 in the following way. The key consists of 256 different addresses, each address representing the permuted location in the output buffer 12 of one of the words of the block encrypted data. The output of the block encryption process is read consecutively and stored into the memory locations of the output buffer 12, also in data store 5, addressed by consecutive addresses of the permuting key, thus placing the fully encrypted output into proper slots of the output buffer. The keys are stored in the data store, and may be derived directly or indirectly from password data.

Figure 2:
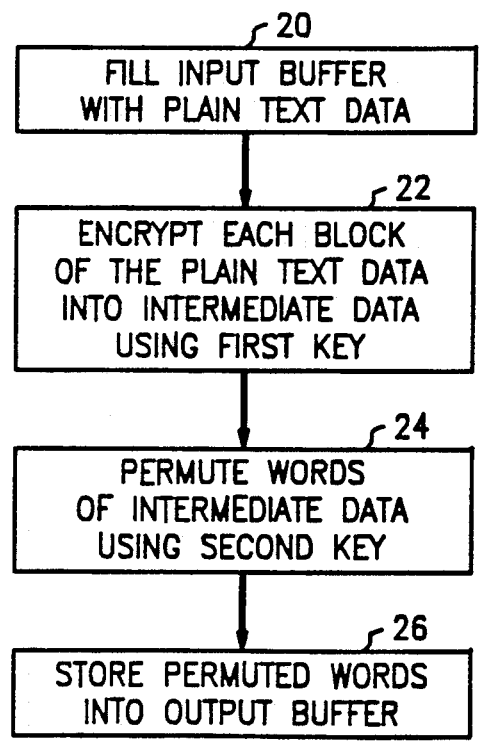
FIG. 2 is a flow diagram illustrating the principles of the invention.

FIG. 2 is a flow chart of the method corresponding to the block diagram of FIG. 1. Block 20 indicates that the input buffer is first filled with plain text data (action box 20). Each block of the plain text data is then encrypted into intermediate data using the first key (action box 22). The words of intermediate data are then permuted using a second key (action box 24) and the permuted results are stored into an output buffer (action box 26).

A tradeoff can be made in the system between the length of the block and the length of the buffer. Clearly, the longer the buffer the more impervious the permuting process to brute force decryption. This permits the use of relatively less sophisticated block encryption arrangements while still retaining a high level of assurance that the encrypted message cannot be decoded without knowledge of the key.

In order to make unauthorized decryption more complex, any incomplete plain text buffer should be completed with random data. This avoids the situation wherein, for example, the last part of a buffer comprises blocks of all zeroes or of all spaces which results in a plurality of blocks identical in their unencrypted, therefore, also in their block encrypted form.

Many block encryption methods, such as the DES, were designed to be inefficient to implement in software. This invention permits the use of a simpler, more efficient block encryptor to be used, while retaining high overall resistance to unauthorized decryption. An alternate embodiment of this invention, which is easily and efficiently implementable in software, consists of 64 block encryptors (each 4 bytes wide) operating on a 256 byte buffer, followed by a permutation of the 256 bytes. Each 32-bit block encryptor consists of 4 DES-like rounds implemented with look-up tables, which are derived from the key (see FIG. 3). This embodiment, implemented in software on a common microprocessor, is so efficient that encrypting a disk sector requires less time than writing the encrypted sector to disk.

Figure 3:
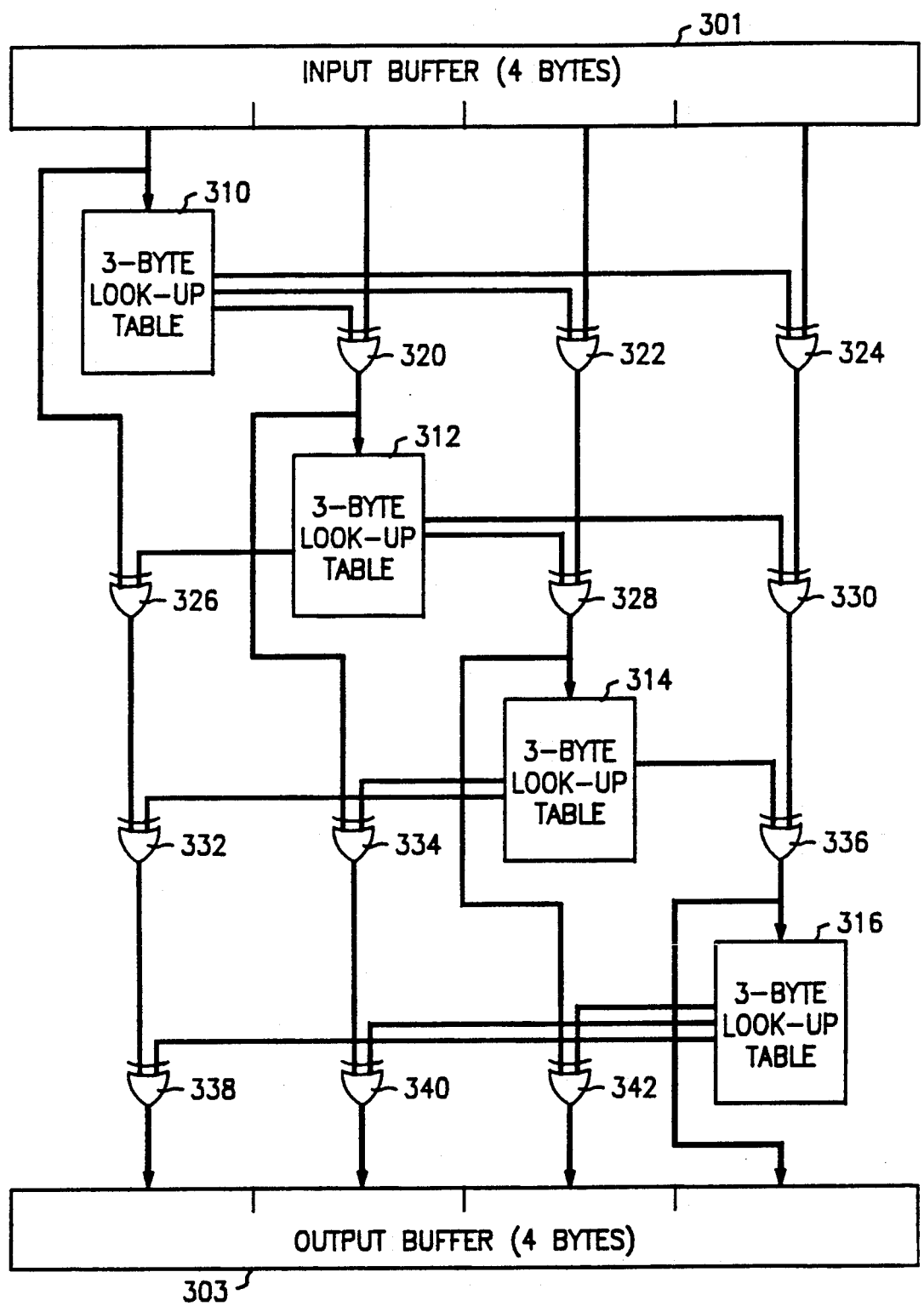
FIG. 3 is a block diagram of a block encryptor that is easily implemented in software.

FIG. 3 is a block diagram of an encryptor that is easily implemented in software. Four bytes (32 bits) of information are originally stored in input buffer 301 and are encrypted for storage in output buffer 303. The encryption process uses 4 table look-up operations (blocks 310, 312, 314, and 316) and 12 circuits for performing the exclusive-or (XOR) sum of two one byte inputs (circuits 320, 322, 324, 326, 328, 330, 332, 334, 336, 338, 340, 342). At the first level, block 310 accesses one of 256 3-byte entries in a look-up table that is derived from the block encoding key. Block 310 is addressed by the first byte from the input buffer and its output is combined by XOR with the contents of the second, third, and fourth bytes of the input buffer in XOR circuits 320, 322, and 324, respectively. The first byte is also one input to XOR circuit 326 in the second stage of encoding. The output of XOR circuit 320 is used to address the look-up table in block 312 and the output of block 312 is combined with the first byte in XOR circuit 326 and the outputs of circuits 322 and 324 in XOR circuits 328 and 330, respectively. The output of XOR circuit 328 is used to address the look-up table in block 314 and the output of block 314 is combined with the outputs of XOR circuit 326, XOR circuit 320 and XOR circuit 330 in XOR circuits 332, 334 and 336. Finally, the output of XOR circuit 336 is used to address the look-up table in block 316 and the output of block 316 is combined with the outputs of XOR circuits 332, 334, and 328, in XOR circuits 338, 340, 342, respectively. The outputs of XOR circuits 338, 340, 342, and 336 are the inputs of output buffer 303. While the operation of the encryptor of FIG. 3 has been described as a circuit, it can be readily seen that a program controlled processor, such as processor 2, can perform the look-up operations of blocks 310, 312, 314 and 316 and the XOR combination of circuits 320, . . . , 342.

In an alternative embodiment, a single key can be used for both the block encryption and the permutation. The permutation key can be used to supply in replicated form, or in some other simply derived form such as three successive bytes, the output of the look-up operation blocks 310, 312, 314, and 316. This design choice leads to a less perfectly random block encryption, but avoids the necessity of deriving two keys. In other alternative embodiments, several tables of keys are used to encrypt blocks, and the different tables are used for successive blocks or successive messages. This improves encryption at the cost of deriving a longer encryption table.

It is to be understood that the above descriptions are only of two embodiments of the invention. Numerous other arrangements may be devised by one skilled in the art without departing from the spirit and scope of the invention. The invention is thus limited only as defined in the accompanying claims.

I claim:

1. A method of encrypting superblocks of data comprising the steps of:
    encrypting each of a plurality of blocks of each of said superblocks, using a first key, each encrypted block and each unencrypted block comprising a plurality of segments, each segment comprising a plurality of bits; and
    permuting successive segments of said plurality of encrypted blocks over the range of each of said superblocks, using a second key, to form encrypted superblocks of data.

2. The method of claim 1 wherein said permuting comprises:
    storing said successive segments of said plurality of blocks in locations of memory determined by successive elements of said second key.

3. The method of claim 2 wherein said segments are bytes.

4. The method of claim 2 wherein a processor having a word length n permutes said successive segments and wherein said segments are words of length n.

5. Apparatus for encrypting superblocks of data comprising:
    means for encrypting each of a plurality of blocks of said superblocks of data, using a first key to form intermediate data, wherein each encrypted block and each unencrypted block comprises a plurality of segments, and each segment comprises a plurality of bits; and
    means for permuting segments of said intermediate data over the range of each of said superblocks using a second key to form encrypted superblocks of data.

6. The apparatus of claim 5 wherein said means for permuting comprises a processor, operative under the control of a program for storing successive segments of said intermediate data in locations determined by successive elements of said second key.

7. The apparatus of claim 6 wherein said segments of said intermediate data are bytes.

8. The apparatus of claim 6 wherein said processor has a word length n and said segments of said intermediate data are words of length n.

9. A method of encrypting superblocks of data comprising the steps of:
    encrypting a plurality of blocks of each of said superblocks, using a key, each encrypted block and each unencrypted block comprising a plurality of segments, each segment comprising a plurality of bits; and
    permuting successive segments of said plurality of encrypted blocks over the range of each of said superblocks, using said key, to form encrypted superblocks of data.

10. The method of claim 9 wherein said permuting comprises:
    storing said successive segments of said plurality of blocks in locations of memory determined by successive elements of said key.

11. The method of claim 10 wherein said segments are bytes.

12. The method of claim 10 wherein a processor having a word length n permutes said successive segments and wherein said segments are words of length n.

13. A method of encrypting a superblock of 4M bytes of plain text data comprising the steps of:
encrypting M 4-byte blocks of said superblock of plain text, using a first key, to form 4M bytes of intermediate data; and
permuting successive bytes of each byte of said intermediate data over the range of said superblock, using a second key, to form an encrypted superblock of data corresponding to said superblock of plain text data;
wherein said first and second key are formed from a password supplied by a user of said encryption method;
wherein said first key comprises a table of 256 3-byte words selected according to values of plain text and partially encoded bytes of a block; and
wherein said second key comprises 4M different address offsets for storage of successive bytes of said intermediate data to form said encrypted superblock of data.

* * * * *